United States Patent [19]
Adamian

[11] 3,963,940
[45] June 15, 1976

[54] AUTOMATIC HEADLIGHT CONTROL CIRCUIT

[76] Inventor: Michael R. Adamian, P.O. Box 223, Naperville, Ill. 60540

[22] Filed: Feb. 4, 1975

[21] Appl. No.: 547,002

[52] U.S. Cl. ............... 307/10 LS; 307/10 BP; 315/83; 340/56
[51] Int. Cl.² ............................... B60Q 1/08
[58] Field of Search .......... 307/10 LS, 10 BP, 10 R; 315/83, 82, 77, 76; 340/56, 76

[56] References Cited
UNITED STATES PATENTS

| | | | |
|---|---|---|---|
| 3,769,519 | 10/1973 | Adamian | 307/10 LS |
| 3,798,500 | 3/1974 | Florence et al. | 307/10 LS |
| 3,818,267 | 6/1974 | Hill et al. | 315/82 |
| 3,881,128 | 4/1975 | Douglas et al. | 315/83 |

Primary Examiner—Herman J. Hohauser
Attorney, Agent, or Firm—Peter Visserman

[57] ABSTRACT

An automatic headlight control circuit is disclosed which will serve to turn-on automobile lights in response to pulsed external signals such as ignition pulses. A delay circuit is provided which will cause the lights to be turned-off a predetermined period of time after the external signals to the control circuit have ceased. A delay of several minutes is accomplished using an emitter follower circuit.

6 Claims, 3 Drawing Figures

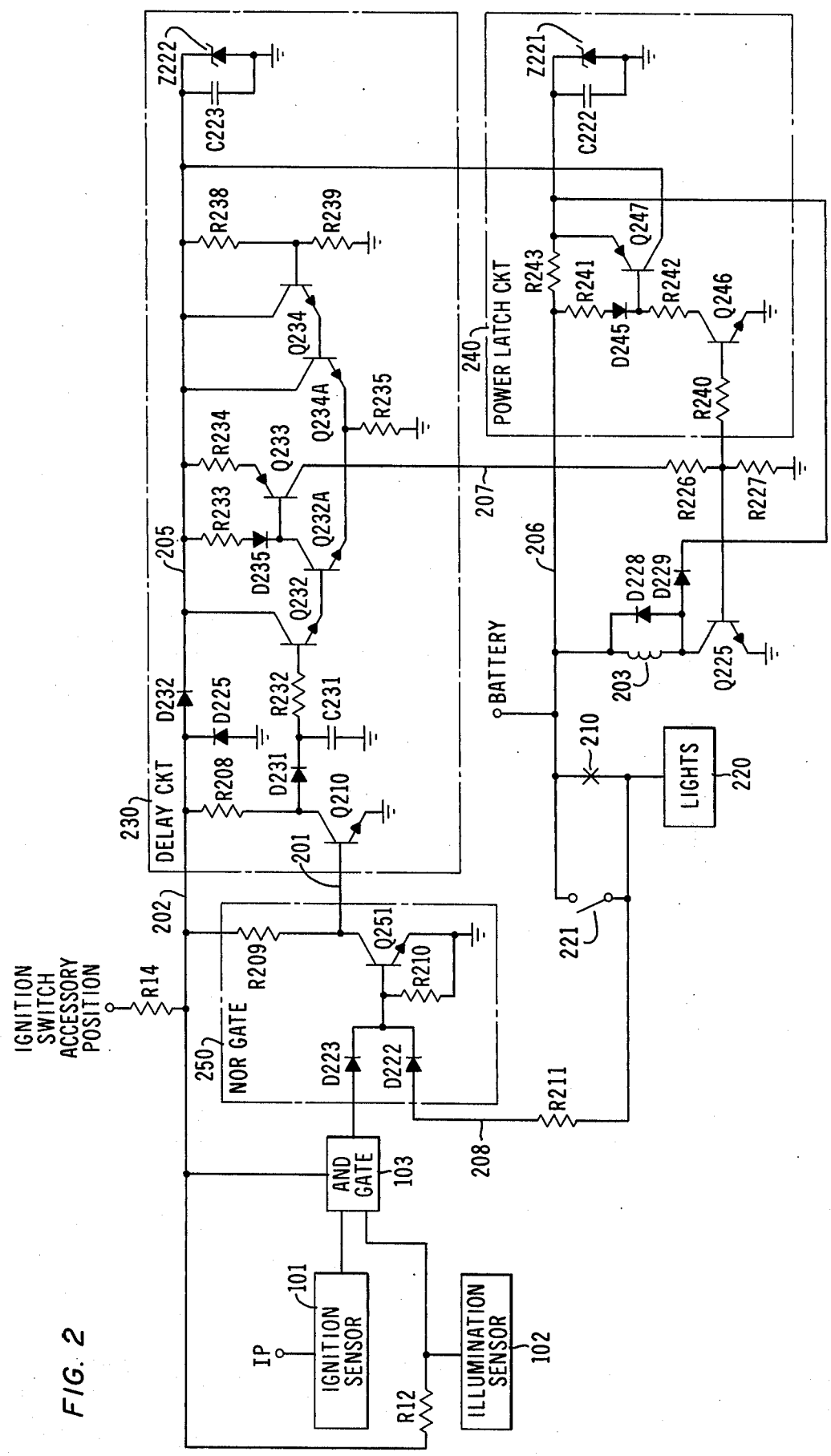

AUTOMATIC HEADLIGHT CONTROL CIRCUIT

BACKGROUND OF THE INVENTION

1. Field of the Invention

The invention relates to an electronic headlight control circuit and more particulary relates to a circuit for turning on car lights in response to an external stimulus indicating that headlights are required and comprising a delay circuit for turning off headlights a predetermined period of time after the car's engine has been stopped.

2. Prior Art

From the prior art it is known that automotive headlights may be turned on by means of manual-operated switch or an automatic control. Similarly, a number of prior art devices are known for turning off headlights a predetermined period of time after the engine has been turned off. One prior art automatic headlight control circuit is disclosed in U.S. Pat. No. 3,769,519. The automatic control of that patent turns on automobile headlights by converting engine ignition pulses to a continuous level signal for activating a relay or the like. The control turns off the lights a predetermined period of time after the ignition impulses have ceased. A need for an inexpensive and reliable control circuit with a relative long time delay to cause the car's headlights to turn off a substantial period of time after the engine has been shut off, has been recognized. It is desirable to generate a time delay of several minutes to allow motorists to have the benefit of the headlights while leaving the automobile. The use of commonly known R-C circuits to achieve time delay is well known from the art. It is also known to those skilled in the art that a charged capacitor of nominal size discharges relatively rapidly and in order to obtain a time delay of more than a few seconds a physically large capacitor will be needed. The use of such capacitors has readily recognizable disadvantages. Apart from size disadvantages, larger capacitors which are commonly available have substantial leakage. Capacitor leakage is a particular problem where the capacitor is to be discharged over a long period of time.

SUMMARY OF THE INVENTION

It is an object of the present invention to provide an inexpensive and reliable automatic headlight control which will not interfere with the normal operation of headlight controls. It is a further object of the invention to provide a delay circuit for controlling the turn-off of automobile headlights a substantial period of time after the car's engine has stopped.

In accordance with the present invention an automobile's ignition pulses are coupled to the control input terminal of silicon controlled rectifier (SCR) or similar device, which when activated by a first pulse will thereafter continue to conduct current. The SCR or like device is connected in series with the automobile's lights and when conducting supplies the necessary current to the lights. A novel circuit is provided to temporarily interrupt the flow of current in the SCR when the lights are no longer required, thereby turning off the SCR and the lights. A delay circuit is provided for delaying the turning off the lights by several minutes. The delay circuit employs an effective R-C network having an unusually large discharge time constant. The capacitor is a standard size electronic capacitor whose discharge path comprises resistive elements and the base-to-emitter junction of at least one transistor connected in the emitter follower configuration. In one illustrative embodiment of this invention, the discharge path of the capacitor comprises two transistors connected serially and forming part of a voltage comparator circuit.

In an alternative embodiment of the invention a relay is used in conjunction with the delay circuit to control the automobile's lights. In order to reduce current drain when the automobile is not in operation, the current supply for the control circuit may be connected to the accessory position of the ignition switch. A circuit is provided for supplying current to the control circuit after the ignition is turned and while the headlights remain on.

BRIEF DESCRIPTION OF THE DRAWING

FIG. 2 is a schematic circuit diagram showing an automatic light control circuit employing a delay circuit, a power latch circuit, and a light relay.

DETAILED DESCRIPTION

Figure 1:
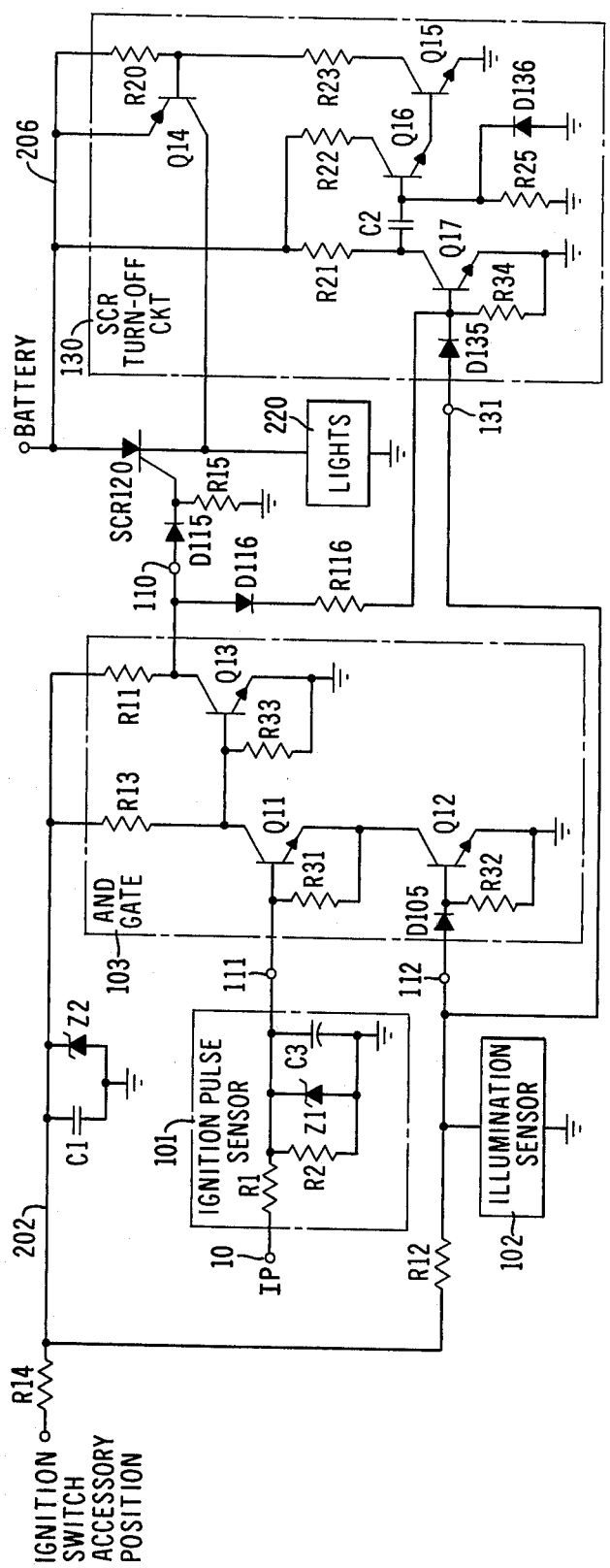
FIG. 1 is a schematic circuit diagram showing an automatic light control circuit employing an SCR.

Ignition pulses (IP) taken from the primary coil of the engine ignition system are applied to the terminal 10 of the ignition pulse sensor 101. The resistors R1 and R2 shown in FIG. 1, form a voltage divider, R1 being chosen of sufficiently large value, e.g., 50 K ohms, to prevent inordinate current drain from the ignition coil. The zener diode Z1 and capacitor C3 protect the remainder of the circuit from excessive transients by clamping the input to transistor Q11. The transistors Q11, Q12, and Q13 form a gate circuit for performing the logical AND function. That is, the output conductor 110 of the AND circuit 103, will provide a "high" output signal only if a "high" input signal is simultaneously supplied to base terminals 111 and 112 of transistors Q11 and Q12, respectively. The illumination sensor 102 may be any light sensitive device which changes its conductivity in the presence of light. Sensors are commonly available which are highly conductive when exposed to relatively bright light, e.g., normal daylight. Current is supplied to the sensor 102 from the bus 202 through the resistor R12. When a low level of light is supplied to the sensor, its resistance to current will increase causing an increase in voltage level on base terminal 112 of transistor Q12 sufficient to place Q12 in the conducting state. It will be recognized that as long as the "high" signal prevails at the terminal 112, the output signal occurring at terminal 110 will resemble the input signal at terminal 111. Thus, when the vehicle's engine is running a series of pulses of substantially the same duration and repetition rate as the ignition pulses will be produced at terminal 110. These pulses are applied directly to the control terminal of SCR 120. The ignition pulses, and hence the pulses applied to the SCR, will have a duration on the order of 1 millisecond. A pulse of this duration is sufficient to initiate conduction in commercially available SCR's. Once conduction has started in the SCR, subsequent pulses applied to the SCR will have no effect. Since the SCR 120 is in series with the automobile's lights 220, the lights will light and remain lit until the SCR is turned off. To avoid false turn-on of the SCR 120 due to extraneous signals, resistor R15 is provided. Similarly, resistors R31, R32, and R33 are provided to protect against extraneous signals. Capacitor C1 and zener Z2 are provided to protect bus 202 against transient signals. Diode D115 is provided to protect against leakage.

It is a well known characteristic of SCRs that such rectifiers will continue to conduct current, once such conduction has been initiated, even in the absence of a control signal. It is known that in order to turn off an SCR, it is necessary to interrupt the current flow through the SCR. Several schemes for shunting the current from the SCR are known to those skilled in the art. In accordance with the novel scheme of this invention, current through the SCR 120 is interrupted by temporarily shunting the current through a parallel connected transistor. The bus 202 is connected to the car's battery supply by means of resistor R14 and the ignition switch accessory position terminal. As is common, power is supplied to this terminal when the switch is in the "on" or "accessory" position. When the illumination sensor 102 is exposed to a low level of illumination and presents a relatively high resistance path, the voltage level at terminal 131 of SCR turn-off circuit will rise, as described earlier herein with respect to the voltage level at terminal 112 of the AND circuit 103. When the voltage level at terminal 131 is raised to a significantly high level, the NPN transistor Q17 will be switched to the conducting state, with the consequence that no significant current will flow into the base of either of the NPN transistors Q15 and Q16, which are connected as a so-called Darlington pair. When the ignition switch is turned to the "off" position or if the illumination sensor 102 is exposed to sufficient illumination to conduct substantial amount of current, the voltage level at terminals 112 and 131 will drop to such a level that transistors Q12 and Q17 will be switched to the non-conducting state. The effect of Q12 switching to the non-conducting state will not effect the operation of the SCR 120, for reasons mentioned earlier herein. However, the switch of Q17 to the non-conducting state will cause a temporary flow of current into the base of transistor Q16 during the period that capacitor C2 is charged through resistor R21. Consequently Q16 provides base current to Q15 and current will be conducted through resistors R20 and R23 to cause an emitter to base potential difference of sufficient magnitude to drive the PNP transistor Q14 into saturation. Many commercially avaiable PNP transistors have a forward saturation voltage drop appreciably lower than the forward voltage drop of a conducting SCR for comparable currents. When such a transistor is used for Q14, the current will be shunted from the SCR 120 during the greater part of the time that the capacitor C2 is being charged. The time of current interruption required to turn off an SCR may vary, but the values of R21 and C2 may be readily selected such that the time period that Q14 is in saturation exceeds such turn-off time. When the capacitor C2 approaches the fully charged state, Q14 will return to its non-conducting state and the current to the lights will be cut off.

Under normal driving conditions the change in ambient light will be gradual causing the resistance of sensor 102 to change gradually. Diodes D105 and D135 are employed to provide an increased threshold for transistor Q12 and Q15 respectively. The connection from terminal 110 via diode D116 and resistor R116 to the base of transistor Q17 is provided to drive Q17 into saturation when the current supplied at terminal 131 is insufficient to do so. Diode D136 connected to the base of transistor Q16 is provided to allow rapid discharge of capacitor C2. Resistor R25 is employed primarily to accommodate leakage current from the collector of Q16.

FIG. 2 shows the delay circuit of this invention in conjunction with a relay to control current flow to the lights. A power latch circuit is provided to prevent current consumption by the delay circuit when the automobile is not in operation.

FIG. 2 shows the sensors 101 and 102 and the AND gate circuit 103 in block diagram form. The output terminal 110 of AND gate 103 is coupled to the base of the transistor Q251 via diode D223. Similarly, a connection is shown from the manual headlight switch 221 to transistor Q251 via diode D222. It will be recognized that the transistor Q251 and diodes D222 and D223 form a NOR gate. When the signal from the AND gate 103 indicates a condition in which headlights are not required and switch 221 is open, a logical 1 or high level voltage signal will be generated on the conductor 201 at the base of transistor Q210. This signal causes the transistor Q210 to be in a fully conducting state with the result, that substantially all current flowing through resistor R208 is conducted to ground through the transistor Q210. When the switch 221 is closed or a positive signal from AND gate 103 indicates a condition in which the headlights are to be turned on, a logical 0 or low level voltage signals will be generated on conductor 201. Consequently, the transistor Q210 will switch to a non-conducting state and current flowing from the bus 202 will tend to charge capacitor C231 through resistor R208 and diode D231. As discussed earlier herein, the signal generated at terminal 110 may be in the form of a pulsed signal having a duration and repetition rate corresponding to the duration and repetition rate of the ignition pulses. The capacitor C231 may be relatively small for example, on the order of 2 to 5 microfarads. The resistor R208 may be on the order of 1 K ohms. After a few ignition pulses have occurred, the voltage across the capacitor C231 will have reached a level greater than a predetermined level. When switch 221 is closed a steady state signal will be applied to the base of transistor Q210 and the capacitor C231 will be charged until the voltage level across the capacitor reaches a predetermined level.

The base of transistor Q232 is connected to the capacitor C231 through resistor R232. Transistors pairs Q232 and Q232A and Q234 and Q234A, are connected serially as so-called Darlington pairs as shown in FIG. 2. These four NPN transistors further are interconnected to form a comparator circuit. The resistors R238 and R239 form a voltage divider and current flowing through these resistors will cause the base of the transistor Q234 to be held at a specified reference voltage. When the voltage at the base of transistor Q234A is a few millivolts higher than the voltage at the base of transistor Q232A, the transistor Q234A will conduct and transistor Q232A will remain in the non-conducting state. When the voltage at the base of transistor Q232A rises above the voltage at the base of transistor Q234A by a few millivolts, the comparator circuit switches and the transistor Q232A will be placed in a conducting state. Accordingly, when the voltage across the capacitor C231 reaches the predetermined level which is a few millivolts higher than the reference voltage plus the voltage drop across R232, the transistors Q232 and Q232A will be placed in a conducting state. When the transistor Q232A is changed from a non-conducting to a conducting state, the voltage at its collector will drop substantially and the transistor Q233 will begin to conduct. As a result, the voltage level at the juncture between resistance R226 and R227 will be raised. The values for the resistors R226 and R227 are chosen such that the voltage at the juncture of these two resistors will be raised sufficiently to cause the transistor Q225 to be placed in a fully-conducting state. Consequently, the current will flow through the relay coil 203. As a direct result the relay contacts 210 will be closed causing the headlights to be turned on.

In FIG. 2, the bus conductor 202 is connected to the "accessory" terminal of the ignition switch, to which power is supplied when the ignition is either in the "on" or "accessory" position. When the ignition switch is turned to the "off" position the electrical power will be removed from the AND gate 103, as well as the transistor Q210. The diodes D231 and D232 serve to isolate the transistor Q210 and the bus 202 from the remainder of the circuit. In order to provide the necessary power to the delay circuit 230, the bus 205 may be connected directly to the battery supply of the automobile or may be connected thereto by means of the power latch circuit 240, which will supply power to the bus 205 until the car's headlights are turned off and there is no further need for operation of the circuit. The latch circuit 240 shown in FIG. 2 comprising the transistors Q246 and Q247. When transistor Q233 is in the conducting state, the current in conductor 207 will be sufficient to cause the transistor Q246 to be turned on as well as transistor Q225. Since Q225 will conduct a larger current, the resistor R240 is chosen such that the current supplied to the base of transistor Q225 is substantially larger than the current supplied to the base of transistor Q246. When the transistor Q246 is in the conducting state, the voltage at the base of the transistor Q247 will drop to a level below the battery voltage occurring on bus 206, due to the voltage divider action of resistors R241 and R242. An appropriate voltage level difference between the emitter and base of the PNP transistor Q247 will cause this transistor to be placed in the conducting state, supplying current from the bus 206 to bus 205. It will be understood that the current from bus 206 will be supplied to bus 205 as long as sufficient current is flowing through the transistor Q233 to hold transistor Q246 in the conducting state. That is, the current bus 206 will be supplied to bus 205 as long as the charge on the capacitor C231 is sufficient to hold the base of the transistor Q232 at a voltage level slightly higher than the reference voltage at the base of transistor Q234.

When the engine ignition switch is switched to the "off" position, no further current will be supplied to the AND gate 103 or the transistor Q210. The current will be supplied to bus 205 from bus 206 by means of transistor Q247 as explained above. The charge on the capacitor C231 cannot be dissipated through transistor Q210 because of the diode action of the diode D231. The discharge path for the capacitor C231 is through the resistor R232, the transistors Q232 and Q232A, and the resistor R235. It will be recognized that the capacitor C231 will discharge through the mentioned path and the voltage across the capacitor may be expressed as a function of time as follows: $V = IR(1 - e^{-t/RC})$, where $C = C231$ and $R = R232 + 2V_{BE}/IB +$ $\beta^2 \cdot R235$. The voltage $V_{BE}$, is the base to emitter voltage drop of the transistors Q232 and Q232A when in the saturated state. The value of $\beta$ (beta) is the beta of the transistors Q232 and Q232A which will vary depending on the characteristics of the transistor. The typical values for beta may be in the range of 10 to 100. It will be apparent, that the value for $R$ in the equation for the voltage across the capacitor C231 will become very large as beta becomes large. With the passage of time, the capacitor C231 will discharge causing the headlights to be turned off. Since the discharge is very slow, it is important that the voltage levels of the capacitor at which the circuit must react is established relatively accurately. For this reason, the comparator circuit comprising transistors Q232, Q232A, Q234, and Q234A is used. When the voltage at the base of transistor Q232 drops a few millivolts below the reference voltage at the base of the transistor Q234, the comparator will switch and the transistor Q232 will be turned off. Consequently, the transistor Q233 will become non-conducting and as a further consequence, the transistors Q225 and Q246 will be turned off. Since the headlights are controlled through a normally open contact 210 of the relay the headlights will be turned off when the transistor Q225 is turned off. When the transistor Q246 is turned off, current will cease to flow from bus 206 to bus 205 through the transistor Q247 and the circuit will be disconnected from the battery bus.

The circuit comprising resistors R233, R234 and transistor Q233 may be thought of as a current multiplying circuit. The current flowing from emitter to collector of the PNP transistor Q233 may be expressed as the ratio of R233/R234 multiplied by the current flowing from the collector to emitter of the NPN transistor Q232A.

Zener diodes Z221 and Z222 together with accompanying capacitors C222 and C223 are connected to the buses 205 and 206 to regulate the voltage at these buses in a known fashion. The diode D225 has been added to the circuit to absorb negative transients. Diodes D228 and D229 in FIG. 2 are used for isolation purposes.

It will be understood that instead of being connected to the accessory position of the ignition switch, the bus conductors 202 and 205 could be connected to the vehicle's battery supply. In that case there will be no need for the diode D232 or the latch circuit comprising transistors Q246 and Q247, diode D245 and resistors R240, R241, R242, and R243. The main disadvantage of connecting the bus conductors 202 and 205 to the battery supply is that the circuit will be drawing current at all times. When the circuit is connected as shown in FIGS. 2 and 3, most of the current draining components are disconnected from the battery supply when the automobile is not in operation.

Figure 3:
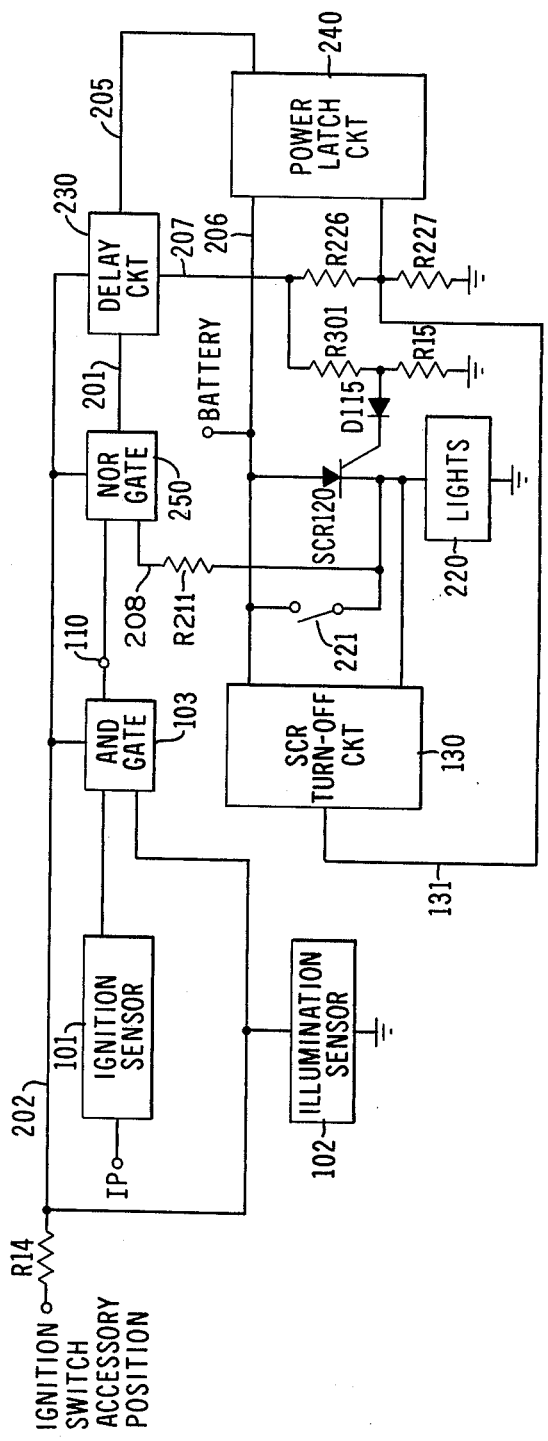
FIG. 3 is a schematic circuit of diagram showing the circuit of FIG. 1 incorporating the delay circuit and power latch circuit of FIG. 2.

FIG. 3 shows a circuit diagram incorporating a silicon controlled rectifier SCR 120 and the delay circuit 230. The NOR gate 250 will generate a "low" signal at input 201 of the delay circuit 230 when the AND gate 103 produces a positive signal on its output terminal 110, indicating that the engine is running and ambient light is low, or the manually operated light switch 221 is closed. As described earlier herein, the delay circuit 230 will supply current to conductor 207 after a steady-state "low" signal originating from the light switch 221, or one or more pulsed "low" signals, originating from the ignition sensor 101, is applied to input terminal 201. The current supplied to the SCR 120 via conductor 207 will be sufficient to initiate current flow from bus 206 through the SCR 120 to the lights 220. Depending on the values of resistors R301, R15, R226, and R227, the current in conductor 207 will split and part of the current will flow into the power latch circuit 240. As explained earlier herein, a current supplying connection will be established from bus 206 to bus 205.

When the ignition switch is moved to the "off" position, or a steady-state "high" signal is presented at terminal 201, the delay circuit will continue to supply current to conductor 207 for a period to time. When current is no longer supplied on conductor 207, the bus connection in the power latch circuit 240 will be opened. Furthermore, a "low" signal will be supplied to the SCR turn-off circuit 130 via conductor 310. This circuit, in a manner described earlier herein will cause the SCR 120 to be turned off, and hence the lights will be extinguished.

It will be recognized that in place of the ignition sensor 101 as disclosed herein, other means may be used to indicate that the engine is running or the automobile is being operated. For example, an engine oil pressure sensor may be used or a connection may be made to the ignition switch. These and other similar means may be employed in conjunction with the circuit of this invention. It will be understood that the circuits described herein comprise an illustrative embodiment of the invention and numerous other arrangements may be devised by those skilled in the art, without departing from the basic principles of the invention.

What is claimed is:

1. Automatic control apparatus for use in an automotive vehicle having one or more lamps, an electrical power source, and a source of engine ignition pulses, said control apparatus comprising:
   circuit means connected to said source of ignition pulses for generating a first series of output signals corresponding to said ignition pulses at least in duration;
   light sensitive means responsive to changes in ambient illumination for indicating level of ambient illumination;
   gate circuit means responsive to said light sensitive means and said first series of signals for generating a second series of output signals corresponding to said ignition pulses, at least in duration, when ambient illumination is below a selected level;
   a gate controlled bi-stable semi-conductor device having a control terminal, a current input terminal, and a current output terminal, and connected at its current input and output terminals in series in a current path from said power source to said lamps and responsive to one of said second series of signals from said gate circuit means corresponding to said ignition pulses at least in duration, applied to said control terminal, to switch from a non-conducting state to a conducting state; and
   circuit means for selectively switching said semi-conductor device from the conducting state to the non-conducting state comprising a transistor connected between said input terminal and said output terminal for shunting current there-between external to said semi-conductor device, and a capacitor connected to said transistor for temporarily placing said transistor in a conducting mode for shunting current external to said semi-conductor device when said lamps are to be extinguished.

2. Automatic light control apparatus for use in a automotive vehicle having one or more lamps, an electrical power source, and means for producing a first signal indicative of operation of said vehicle, said apparatus comprising:
   light sensitive means responsive to changes in ambient illumination for indicating level of illumination;
   a gate circuit responsive to said light sensitive means and said first signal for generating a second signal when ambient illumination is below a selected level;
   a capacitor;
   a current flow control switch connected serially in a current path from said power source to said lamps and operative to close said current path in the presence of a control signal;
   circuit means responsive to said second signal to selectively allow and prevent the flow of charging current to said capacitor;
   a capacitor discharge control circuit comprising a resistor and a first transistor operative to provide a capacitor discharge path and to generate said control signal and having an input terminal connected to said capacitor, a first output terminal connected to said resistor whereby the effective impedance in the capacitor discharge path includes the impedance of said resistor multiplied by the amplification factor of said first transistor, and a second output terminal connected to said current flow control switch.

3. Automatic light control apparatus in accordance with claim 2, and further comprising circuit means for cutting off electrical power to said discharge control circuit after the potential across said capacitor has dropped below a predetermined level.

4. Automatic light control apparatus in accordance with claim 2, wherein said capacitor discharge control circuit further comprises a second transistor and wherein said first and said second transistor form a comparator circuit controlled by a reference potential and a potential across said capacitor, said comparator circuit being operative to complete a capacitor discharge path only when said potential across said capacitor exceeds said reference potential.

5. Apparatus for controlling automotive headlights comprising:
   a capacitor;
   circuit means responsive to a headlight turn-on signal for allowing flow of charge to said capacitor and responsive to a headlight turn-off signal for preventing flow of charge to said capacitor;
   a bi-stable comparator circuit connected to said capacitor and a reference potential, said comparator assuming a first state when the potential across said capacitor exceeds said reference potential and second state when said reference potential exceeds the potential across said capacitor;
   circuit means connected to said comparator for establishing a path from a vehicle power source to said headlights when said comparator is in said first stable state and opening said path when said comparator is in said second stable state.

6. Apparatus in accordance with claim 5 wherein said comparator circuit comprises at least two transistors and said capacitor has a discharge path through one of said transistors.

* * * * *